US005604493A

United States Patent [19]
Behlke

[11] Patent Number: 5,604,493
[45] Date of Patent: Feb. 18, 1997

[54] SECURITY SYSTEM TRANSMITTER WITH OPPOSED CONCAVE ACTUATORS

[75] Inventor: George E. Behlke, Victor, N.Y.

[73] Assignee: Detection Systems, Inc., Fairport, N.Y.

[21] Appl. No.: 574,530

[22] Filed: Dec. 19, 1995

[51] Int. Cl.⁶ .................................................. H03K 17/94
[52] U.S. Cl. ........................... 341/22; 341/34; 455/95; 455/128
[58] Field of Search .............................. 341/176, 20, 22, 341/24, 34; 340/539; 455/89, 90, 95, 128, 347; 361/679, 680, 724, 728; D14/137, 155, 218

[56] References Cited

U.S. PATENT DOCUMENTS

| | | | |
|---|---|---|---|
| 3,833,895 | 9/1974 | Fecteau | 340/224 |
| 4,224,602 | 9/1980 | Anderson et al. | 341/22 |
| 4,261,042 | 4/1981 | Ishiwatari et al. | 341/22 |
| 4,611,198 | 9/1986 | Levinson et al. | 340/539 |
| 4,694,282 | 9/1987 | Tamura et al. | 340/539 |
| 4,884,060 | 11/1989 | Shapiro | 340/514 |
| 5,365,217 | 11/1994 | Toner | 340/539 |
| 5,416,466 | 5/1995 | Malvaso et al. | 340/539 |
| 5,467,074 | 11/1995 | Pedtke | 340/539 |

*Primary Examiner*—Jeffery Hofsass
*Assistant Examiner*—Andrew Hill
*Attorney, Agent, or Firm*—J. Addison Mathews

[57] ABSTRACT

In a security system, a transmitter housing and first and second transmitter actuation elements cooperate to define thumb and finger saddles on opposite sides of the housing. The peripheral edge of the housing and the first and second actuation elements have matched configurations aligned at the thumb and finger saddles for guiding a hand to properly operate the transmitter while blocking other objects from accidental operation. The housing extends beyond the actuation elements at the ends of the elements while the actuation elements extend beyond the housing at the center of the elements. The housing has a first texture, such as a rigid plastic, while the actuation elements have a softer feel provided, for example, by an elastomeric material.

15 Claims, 4 Drawing Sheets

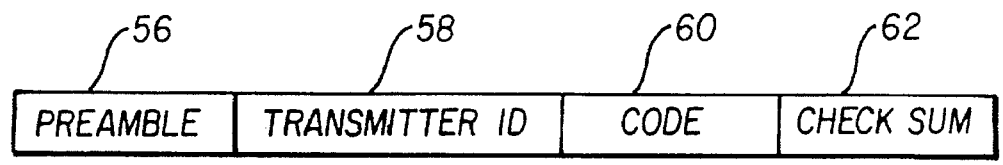
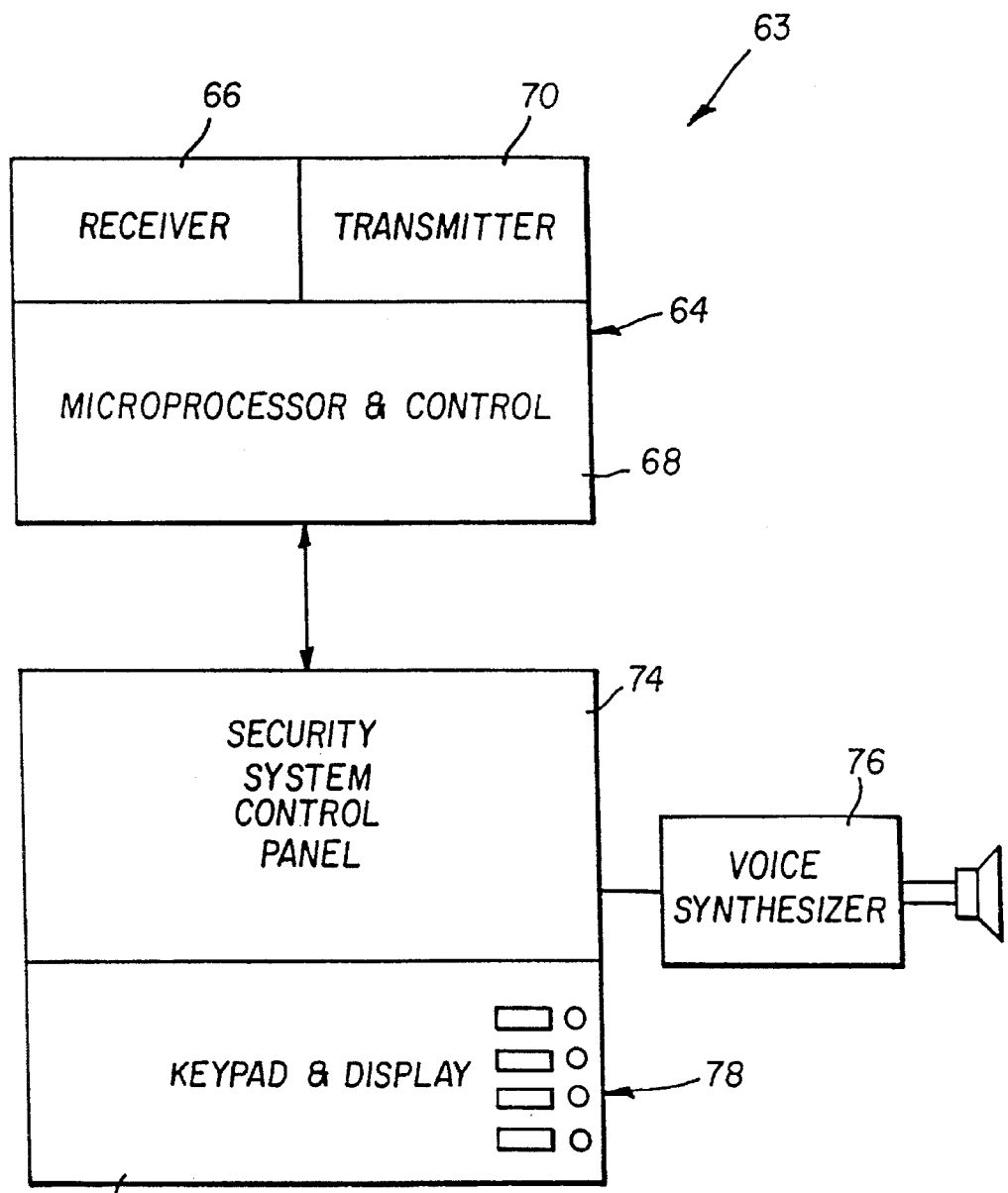
FIG. 6
FIG. 7

SECURITY SYSTEM TRANSMITTER WITH OPPOSED CONCAVE ACTUATORS

DESCRIPTION

1. Field of the Invention

The invention relates to security systems, and more specifically to a wireless transmitter having opposed actuation keys for operating the transmitter to control a security system.

2. Background of the Invention

Security systems typically have several modes of operation controlled from a keypad on the secured premises. A personal identification number is entered to validate authorized users, who can then select the desired mode of operation. The system can be partially or fully armed or disarmed from the keypad, or a test sequence can be initiated. A panic mode also may be available for activating an alarm in case a threatening event is recognized first by the user.

In addition to keypads, portable transmitters have been employed for selecting the system operating mode from a remote location. Fecteau patent No. 3,833,895, discloses one example including a radio frequency transmitter having two buttons. Depression of one button interrogates the system and initiates a delay mode permitting authorized entry of the monitored premises without activating the alarm. Simultaneous depression of both buttons activates the system alarm to summon help in a personal emergency. Another example is disclosed in Tamura et al patent No. 4,694,282. The Tamura transmitter includes several buttons for controlling a security system and a separate panic button for personal emergencies. Still another example is presented by Shapiro in U.S. Pat. No. 4,884,060. Shapiro discloses a subscriber unit having a multi-function switch for selecting between home or away modes of operation. In the home mode, activation of a portable transmitter sends an emergency signal to call for help. In the away mode, the same portable transmitter is used for command and control purposes.

More recent examples of portable transmitters have addressed portability, reliability and the reduction of false alarms. Pedtke U.S. No. 5,467,074, and Malvaso U.S. Pat. No. 5,416,466, disclose personal security systems including two button transmitters. The buttons are located on opposite edges of the transmitter and are depressed toward one another. An alarm signal is transmitted when the buttons are depressed simultaneously. A test signal is transmitted when they are depressed in sequence.

The above described transmitters provide many advantages in security systems. They permit remote control of fire and intrusion detection systems, as well as panic alarms and requests for assistance in personal emergencies. They also can be combined with remote entry mechanisms that facilitate controlled access to buildings, cars or the like. At the same time, however, and as will become more apparent from the following description, existing transmitters can be further improved to facilitate proper actuation with still further reductions in false alarms, particularly when stored in a pocket or purse or operated from a blind environment.

SUMMARY OF THE INVENTION

The present invention is directed to improving portable communicators, such as transmitters, for personal security systems. Briefly summarized, according to one aspect of the invention, a transmitter housing and first and second transmitter actuation elements cooperate to define thumb and finger saddles on opposite sides of the housing. The peripheral edge of the housing and the first and second actuation elements have matched configurations aligned at the thumb and finger saddles for guiding a hand to properly operate the transmitter while blocking other objects from accidental operation.

According to more specific features, the opposed saddles are defined by first and second pairs of arcuate lips at the peripheral edge of the housing on opposite sides of the housing. The lips are concave toward the center of the housing. The first and second actuation elements define opposed arcuate surfaces that are accessible between the lips to operate the transmitter. The actuation elements also are concave toward the center of said housing and, although the radius is slightly different, have an arcuate shape and alignment corresponding to the lips.

Other features of the invention include a housing that extends beyond the actuation elements at the ends of the elements while the actuation elements extend beyond the housing at the center of the elements. Still more specifically, the housing has a first texture, such as a rigid plastic, while the actuation elements have a softer feel provided, for example, by an elastomeric material.

The housing is relatively flat, defining a peripheral edge that is less than three quarters of an inch thick compared to length and width dimensions that are more than twice the edge thickness. The actuation elements are approximately half the edge thickness and one third of the transmitter length.

BRIEF DESCRIPTION OF THE DRAWINGS

FIG. 6 is a schematic view of a signal transmitted by the communicator of FIGS. 1–3.

FIG. 7 is a block diagram representing a security system including a control panel and interface card according to the preferred embodiment.

DETAILED DESCRIPTION OF THE INVENTION

Figure 1:
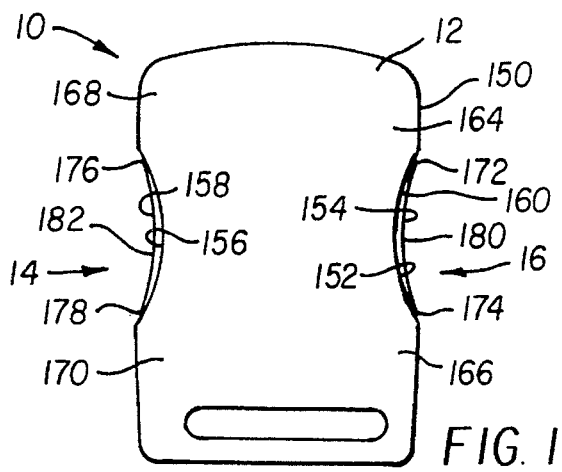
FIGS. 1, 2 and 3 are front, side and back views, respectively, of a hand portable communicator including a two button transmitter for use with a security system in accordance with a preferred embodiment of the invention.

Referring now to the drawings, and beginning with FIGS. 1–4, a preferred embodiment of the invention is depicted in a hand holdable and portable communicator 10. The communicator is adapted for sending wireless control signals to a security system to set its operating mode. Typically modes include "test," disarmed and partially and fully armed for "home" and "away." Features of an exemplary security system will be described more fully hereinafter in connection with FIGS. 7–9.

The communicator has particular utility when used with several different types of security systems. Examples include: a personal security system on a college campus, which calls for help in a personal emergency; an intruder and fire detection system in a home or business; and a car located security system which might include theft prevention and vehicle location. The communicator also might be combined with other features such as an automobile controller for locking and unlocking doors, starting the engine or sounding the horn. This description is directed primarily to a fire and intrusion detection system, but easily can be modified for other systems and combined applications.

The communicator includes a housing 12 supporting two actuation elements depicted as operating keys 14 and 16 and containing a microcontroller and signal encoding section 18 and output section 20. The output section preferably includes a transmitter and receiver, sometimes referred to as a transceiver. A plurality of visible indicators, such as light emitting diodes 22, 24, 26 and 28, are connected to the microcontroller through appropriate drivers 30, 32, 34 and 36. A piezoelectric horn 38 is coupled in a similar manner through driver 40.

The housing itself is adapted as a key ring, and for that purpose includes an elongated aperture 42 for receiving a key chain. An array of protrusions 44 permit orientation of the housing by tactile senses without requiring its removal from a pocket or purse. It will become apparent, however, from the following description, that the communicator can be operated in almost any orientation with the same results.

A transparent panel, or apertures 46, 48, 50 and 52, are provided for viewing the light emitting diodes, and appropriate surfaces 54 are positioned adjacent the apertures for receiving identifying markings corresponding to the above-noted operating modes: test, disarmed, away and home.

The communicator is operated by actuation of keys 14 and 16 to select and transmit a coded radio frequency signal that is detected by the security system. The system then responds by setting the desired mode. The transmitted signal is depicted schematically in FIG. 6, including a preamble 56, a identification code 58 unique to the transmitter, a code 60 representing the desired system operating mode and a check sum 62 for detecting errors. It is the code 58, preferably a multi-bit string, that represents the available operating modes, typically including "test," "disarm," "away" and "home," as mentioned above.

When the communicator 10 is used, the first activated key becomes the selection key, and continued actuation of that same key cycles the selected mode through the available options, e.g. test, disarm, away and home. The other key then becomes the execution key, causing transmission of the radio frequency signal including a code representing the selected option. Alternate actuation of the keys, first one and then the other, transmits a signal including a test code for testing system operation. Simultaneous activation of both keys transmits a signal including an alarm code, used for initiating a panic mode or calling for assistance. Actuation of only one key will not initiate any transmission, which is one approach used for reducing false alarms. After a predetermined time period, such as ten seconds, the communicator resets. The sequential order of actuation is then determined in accordance with the order implemented after the reset.

Referring now to FIG. 7, a fire and intruder detection system 63 is disclosed with a radio frequency interface card 64 controlled by signals from communicator 10. The interface card 64 has a receiver 66, a microprocessor and control 68 and a fixed transmitter 70. Signals transmitted by the portable communicator 10 are detected by receiver 66 and used by the microprocessor and control to determine the desired mode of operation of the detection system. The interface card 64 then emulates a standard keypad 72, acting through the control panel 74, to control the detection system, setting the system to the mode selected and transmitted by the communicator 10. A voice synthesizer 76 and local light emitting diodes 78 also may be provided to indicate the mode of operation.

Figure 5:
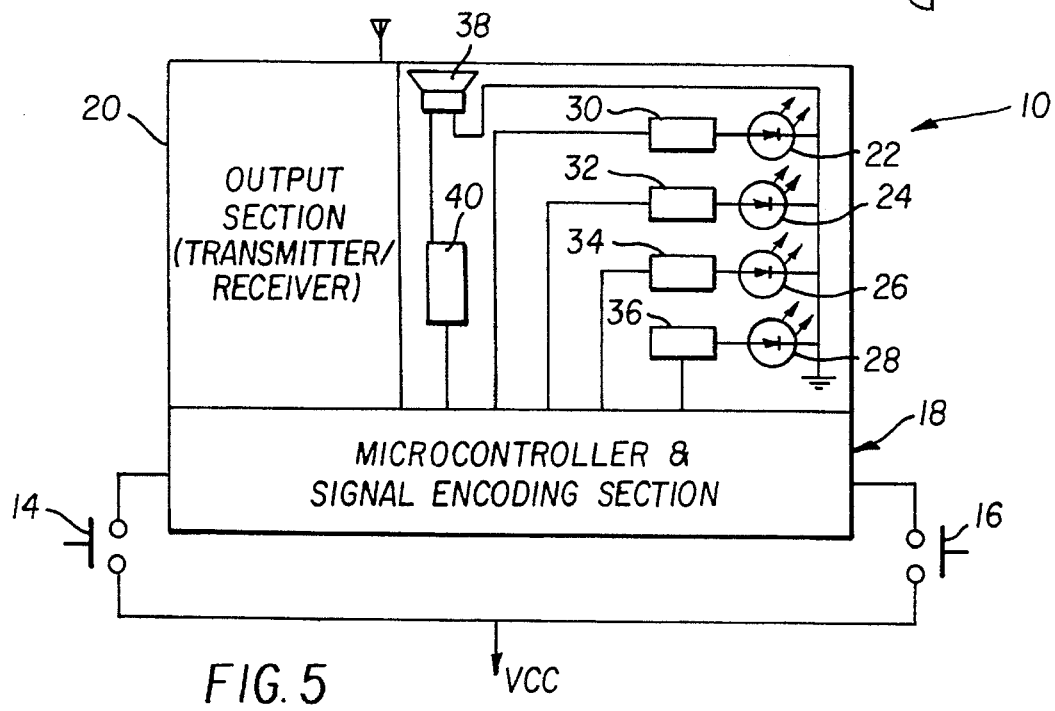
FIG. 5 is a schematic view of the communicator of FIGS. 1–3 illustrating selected features in more detail.

Assuming a successful communication and mode change, microprocessor 68 directs the fixed transmitter 70 to issue a radio frequency confirmation signal. The confirmation signal is detected by transceiver 20 (FIG. 5), and one or more of the light emitting diodes, e.g. 22, and/or the piezoelectric horn 38, emits a perceptible indication of the confirmation. In this preferred embodiment, the light emitting diode associated with the selected and transmitted mode signal blinks a number of times to indicate receipt of the confirmation signal.

Figure 8:
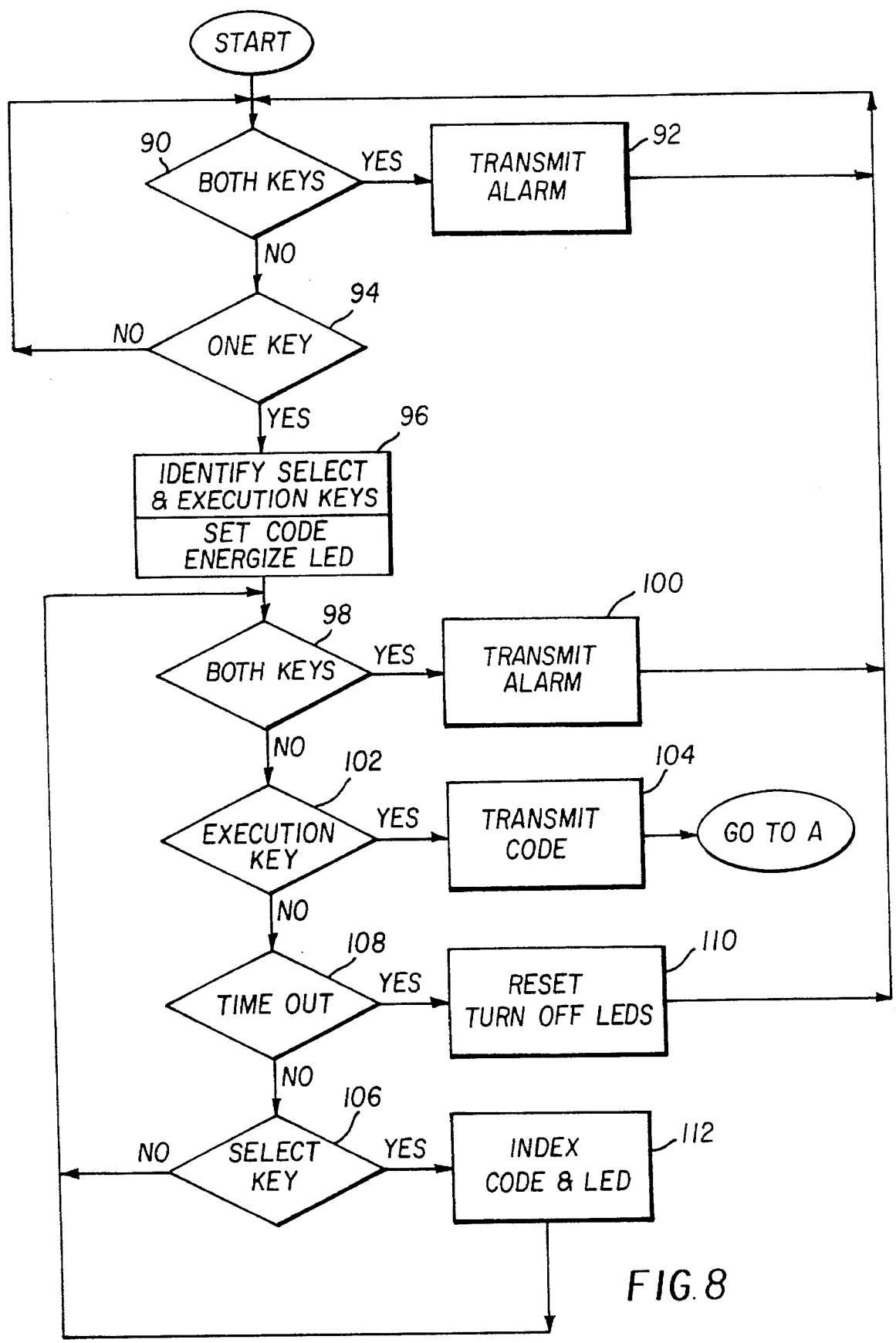
FIGS. 8 and 9 are flow diagrams of a process carried out by the communicator of FIGS. 1–3 according to the preferred embodiment.
Figure 9:
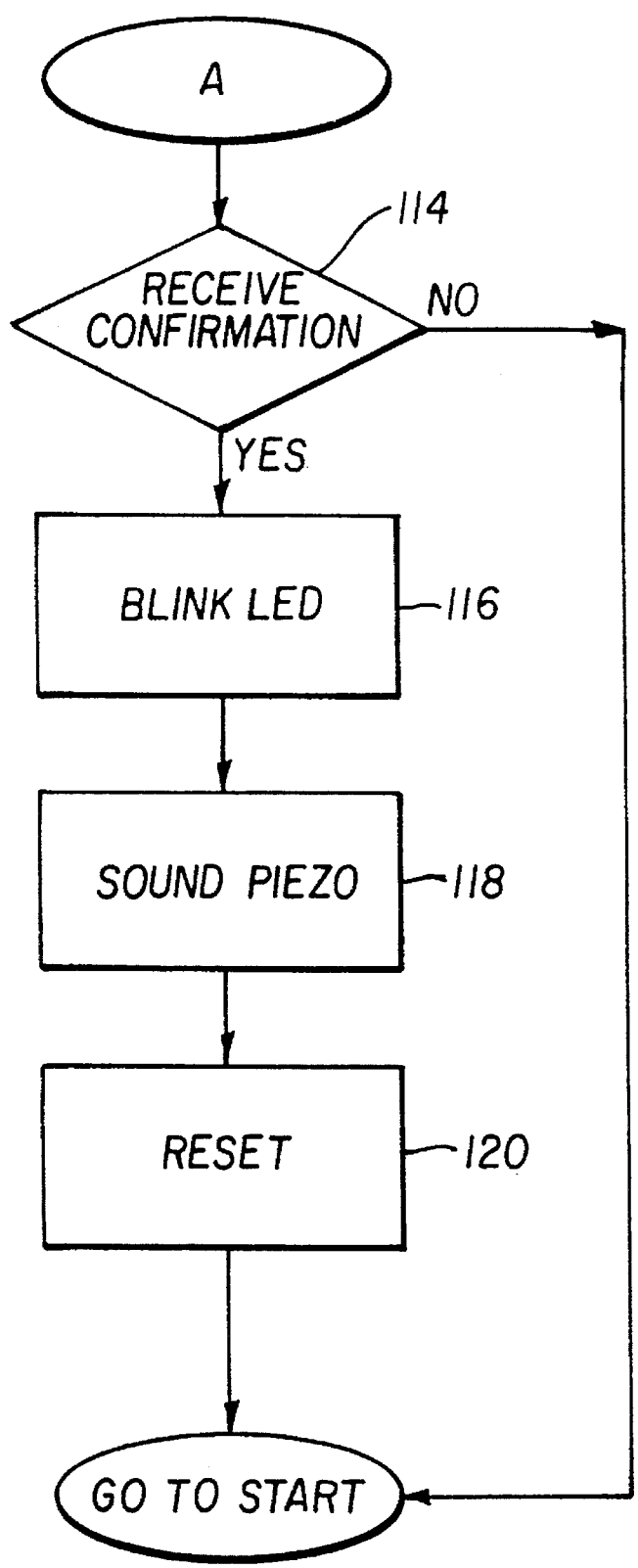

Referring now to FIGS. 8 and 9, flow diagrams are presented depicting the operation of the transmitter 10 with the security system of FIG. 7. If both keys are depressed simultaneously, box 90, an alarm signal is transmitted, box 92. If only one key is depressed, box 94, that key becomes the selection key and the other key becomes the execution key, box 96. The function code is set for the test mode, and the corresponding light emitting diode is energized to show the test mode is selected, box 96. The piezoelectric horn also is sounded, as it is whenever any key is depressed. For the purpose of simplicity, however, this feature is not represented on the flow diagrams.

If both keys are depressed simultaneously, box 98, the alarm signal is transmitted, box 100. If the other key is depressed, box 102, the selected code is transmitted, box 104. If the same key is depressed again, box 106, the microprocessor indexes through the available codes until one is selected or a time out period is exceeded, box 108, resetting the sequence, box 110. Again, the selected code is indicated by a corresponding light emitting diode, box 112.

When the transmitting key is depressed, a representation of the selected code is transmitted to the security system interface card 64 (FIG. 7). The interface card emulates a keypad, sets the security system to the operating mode corresponding to the selected and transmitted code, and returns a confirmation signal to the portable communicator, box 114 (FIG. 9). The communicator then blinks one of the light emitting diodes, box 116 and sounds the piezoelectric horn, box 118. The microcontroller then resets the process for the next operation, box 120.

Referring now more specifically to the details of a preferred embodiment of the invention, as depicted in FIGS. 1–4, a peripheral edge 150 of the transmitter housing 12, and the actuation elements 14 and 16, cooperate to define thumb and finger saddles on opposite sides of the housing. The peripheral edge 150 and the actuation elements 14 and 16 have matched arcuate configurations 152 and 154 on one housing side and 156 and 158 on the other housing side. The matched configurations are aligned at the thumb and finger saddles for guiding a hand to properly operate the transmitter while blocking other objects from accidental operation.

The opposed saddles are defined by first and second pairs of arcuate lips 160/162 (only one pair is shown on FIG. 2) at the peripheral edge of the housing on opposite sides of the housing. The lips are concave toward the center of the housing. The opposed arcuate surfaces 154 and 158 of the actuation elements are accessible between the lips to operate the transmitter. The actuation elements also are concave toward the center of said housing and, although their radius is slightly longer, the actuation elements have a shape and alignment corresponding to the housing arcuate configurations 152 and 156.

Figure 2:
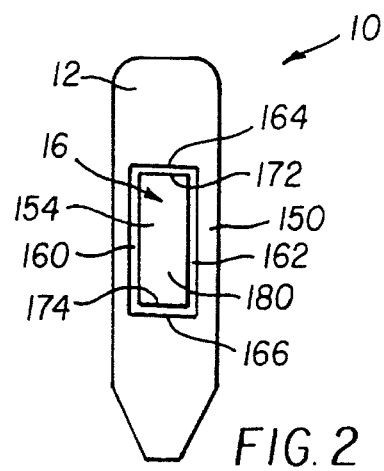
Figure 3:
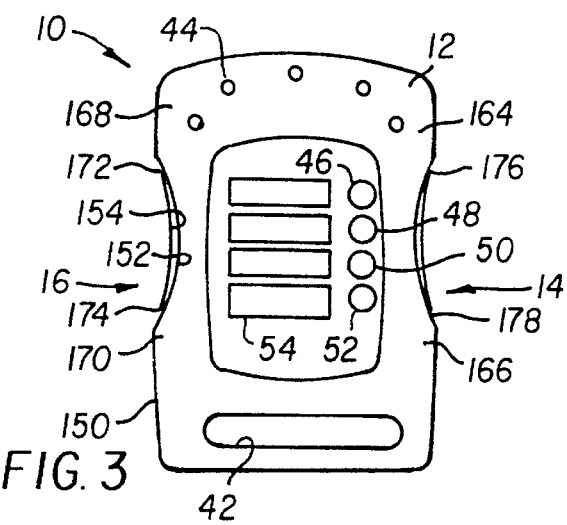
Figure 4:
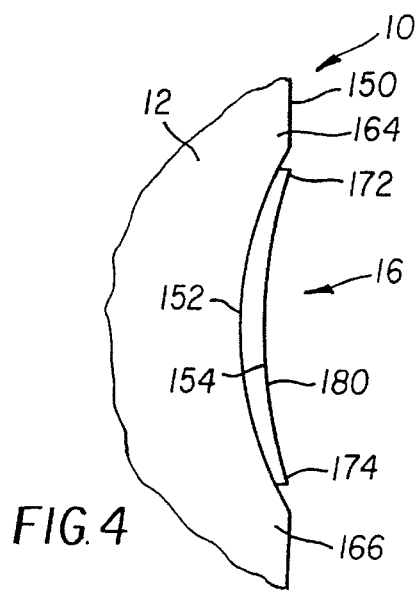
FIG. 4 is an enlarged view of a portion of the communicator of FIGS. 1–3 depicting the alignment between the ends of the buttons and the transmitter housing.

Referring more specifically to FIGS. 1, 2 and 4, housing sections 164, 166, 168 and 170 extend beyond the actuation elements 14 and 16 at the ends 172, 174, 176 and 178 of the elements, while the actuation elements extend beyond the housing at the center of the elements 180 and 182. Foreign objects which are longer than the exposed portions of the actuation elements, such as might be present in a pocket or purse, will bridge the elements, engaging the housing at 164 and 166, for example, without depressing the elements. However, a thumb and index finger will be guided toward the central portion 180 of the element where the element is easily depressed toward the center of the housing.

The actuation elements 14 and 16 also are provided with a texture that differs from the remainder of the housing 12. The housing is a rigid generally smooth plastic, while the actuation elements have a softer feel provided, for example, by an elastomeric or flexible polymeric material.

The housing is relatively flat, defining a peripheral edge that is less than three quarters of an inch thick compared to length and width dimensions that are more than twice the edge thickness. The actuation elements are approximately half the edge thickness and one third of the transmitter length.

Exemplary and preferred housing dimensions are approximately nine sixteenths thick by three inches long (exclusive of the key ring) and one and three quarters inches wide at the widest point. The exposed portion of the actuation elements 14 and 16 are each approximately seventeen sixteenths of an inch long by three eighths of an inch thick. The housing aperture that receives the elements is approximately one inch long, or one sixteenth longer than the corresponding actuation element. The radius of the arcuate housing surface is approximately one (1.0) inch centered one and seventy five hundredths (1.75) inches from the centerline of the housing. The radius of the arcuate surface of each actuating element is one and five tenths (1.5) inches centered at two and three tenths (2.3) inches from the centerline of the housing. The actuation elements extend beyond the housing by approximately fifty six one hundredths of an inch at the center of the elements.

Since the communicator 10 is substantially flat and relatively thin, it tends to align itself against the flat sides of the pocket or purse or against other flat items in the pocket or purse. The actuation elements 14 and 16 are located in the edges of the housing 12, which normally will be protected by the surrounding flat objects, and pressure from the surrounding objects will be perpendicular to the direction of actuation.

It should now be apparent that an improved communicator is provided for use with security systems, including fire and intruder detection systems, personal security systems and car security systems. The communicator includes opposed operating keys having exposed actuation surfaces that are physically protected to reduce accidental operation. At the same time the keys are shaped and textured to improve operation in pockets, purses and other environments where it may not be convenient to view the communicator when it is operated.

While the invention is described in connection with a preferred embodiment, other modifications and applications will occur to those skilled in the art. The claims should be interpreted to fairly cover all such modifications and applications within the true spirit and scope of the invention.

PARTS LIST

| Reference No. | Part |
| --- | --- |
| 10. | Communicator |
| 12. | Housing |
| 14. | Operating key |
| 16. | Operating key |
| 18. | Microcontroller and signal encoding section |
| 20. | Output section |
| 22. | Light emitting diode |
| 24. | Light emitting diode |
| 26. | Light emitting diode |
| 28. | Light emitting diode |
| 30. | Driver |
| 32. | Driver |
| 34. | Driver |
| 36. | Driver |
| 38. | Piezoelectric horn |
| 40. | Driver |
| 42. | Elongated aperture |
| 44. | Protrusions |
| 46. | Apertures |
| 48. | Apertures |
| 50. | Apertures |
| 52. | Apertures |
| 54. | Marking surfaces |
| 56. | Signal preamble |
| 58. | Transmitter identification code |
| 60. | Mode code |
| 62. | Check sum error detection |
| 63. | Fire and intruder detection system |
| 64. | Interface card |
| 66. | Receiver |
| 68. | Microprocessor and control |
| 70. | Fixed transmitter |
| 72. | Keypad |
| 74. | Control panel |
| 76. | Voice synthesizer |
| 78. | Light emitting diodes |
| 90–120. | (even Nos.) flow diagram boxes. |
| 150. | Peripheral edge |
| 152. | Arcuate configuration |
| 154. | Arcuate configuration |
| 156. | Arcuate configuration |
| 158. | Arcuate configuration |
| 160/162. | Arcuate lips |
| 164. | Housing section |
| 166. | Housing section |
| 168. | Housing section |
| 170. | Housing section |
| 172. | End of actuation element |
| 174. | End of actuation element |
| 176. | End of actuation element |
| 178. | End of actuation element |
| 180. | Center of actuation element |
| 182. | Center of actuation element |

I claim:

1. A hand portable communicator for use with a security system, said communicator comprising:

a radio frequency transmitter;

a housing containing said transmitter, said housing having a peripheral edge defining first and second opposed concavities, said concavities extending inwardly at opposite sections of said peripheral edge; and, actuation keys supported for relative movement in said housing, said keys including first and second opposed actuation surfaces accessible from outside said housing for operating said transmitter, said first and second surfaces being inwardly concave adjacent said first and second housing concavities, respectively.

2. The invention of claim 1, wherein said housing defines first and second spaced panels joined at said peripheral edge, said peripheral edge defines first and second apertures extending through said edge at said first and second concavities, respectively, and said first and second surfaces fill said first and second apertures.

3. The invention of claim 2, wherein said housing has a first texture and said first and second surfaces have a second texture different from said first texture, whereby said first and second surfaces feel different to human touch.

4. The invention of claim 2, wherein said housing is a rigid material and said first and second surfaces are a polymeric material softer than said housing.

5. The invention of claim 2, wherein said first and second surfaces have a radius slightly greater than said first and second concavities, respectively.

6. A hand holdable communicator including a wireless transmitter, a housing containing the transmitter and defining a peripheral edge, and first and second actuation elements for operating the transmitter, characterized in that:

the housing defines first and second pairs of arcuate lips at said peripheral edge on opposite sides of said housing, respectively, said lip pairs being concave inwardly relative to said housing,; and, the first and second actuation elements define opposed arcuate surfaces concave inwardly relative to said housing and accessible between said lips to operate the transmitter, said arcuate surfaces lying closely adjacent said respective lip pairs.

7. The invention of claim 6, wherein said opposed arcuate surfaces each define first and second end sections separated by a central section, said housing extends beyond said arcuate surfaces at said first and second end sections and said arcuate surfaces extend beyond said housing at said central section.

8. The invention of claim 6, wherein said arcuate surfaces are an elastomeric material having a texture different from said housing.

9. A hand holdable communicator including a wireless transmitter, a housing containing the transmitter and defining a peripheral edge, and first and second actuation elements for operating the transmitter, characterized in that:

said peripheral edge of said housing and said first and second actuation elements together define thumb and finger saddles on opposite sides of said housing, respectively, said peripheral edge and said first and second actuation elements having aligned depressions at said thumb and finger saddles.

10. The invention of claim 9, wherein said thumb and finger saddles each define first and second end sections, separated by a central section, said peripheral edge of said housing extends beyond said actuation elements at said first and second end sections and said actuation elements extend only slightly beyond said peripheral edge at said central section.

11. A hand portable communicator for use with a security system, said communicator comprising:

a radio frequency transmitter;

a housing containing said transmitter, said housing having first and second spaced panels joined along a peripheral edge extending between said panels, said peripheral edge defining opposed concave sections including opposed apertures in said peripheral edge; and, two actuation keys for operating said transmitter, said keys having opposed actuation surfaces accessible through said opposed apertures and defining concave shapes conforming approximately to the shape of said concave sections.

12. The invention of claim 11, wherein said housing has a first texture and said surfaces have a second texture different from said first texture, whereby said surfaces feel different from said housing to human touch.

13. The invention of claim 12, wherein said housing is a rigid material and said surfaces are a soft polymeric material.

14. The invention of claim 11, wherein said peripheral edge is less than three quarters of an inch thick, and said panels define length and width dimensions both more than twice said thickness.

15. The invention of claim 11, wherein said housing defines a first thickness at said peripheral edge, and said actuation surfaces define a second thickness at said peripheral edge approximately half said first thickness.

* * * * *